(12) United States Patent
Atamlh et al.

(10) Patent No.: US 10,802,982 B2
(45) Date of Patent: Oct. 13, 2020

(54) TRUSTED OUT-OF-BAND MEMORY ACQUISITION FOR IOMMU-BASED COMPUTER SYSTEMS

(71) Applicant: Mellanox Technologies, Ltd., Yokneam (IL)

(72) Inventors: Ahmad Atamlh, Oxford (GB); Ofir Arkin, Petah-Tikva (IL); Peter Paneah, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 201 days.

(21) Appl. No.: 15/947,816

(22) Filed: Apr. 8, 2018

(65) Prior Publication Data
US 2019/0310945 A1   Oct. 10, 2019

(51) Int. Cl.
| G06F 12/10 | (2016.01) |
| G06F 13/10 | (2006.01) |
| G06F 13/16 | (2006.01) |
| G06F 13/20 | (2006.01) |
| G06F 13/42 | (2006.01) |

(Continued)

(52) U.S. Cl.
CPC .......... *G06F 12/10* (2013.01); *G06F 12/1081* (2013.01); *G06F 12/1433* (2013.01); *G06F 13/00* (2013.01); *G06F 13/102* (2013.01); *G06F 13/1668* (2013.01); *G06F 13/20* (2013.01); *G06F 13/4282* (2013.01); *G06F 21/554* (2013.01); *G06F 21/567* (2013.01); *G06F 21/57* (2013.01); *G06F 21/85* (2013.01); *G06F 2212/1052* (2013.01); *G06F 2212/502* (2013.01); *G06F 2212/65* (2013.01); *G06F 2213/0026* (2013.01)

(58) Field of Classification Search
CPC .. G06F 12/10; G06F 12/1081; G06F 12/0835; G06F 13/00; G06F 13/102; G06F 12/1027
See application file for complete search history.

(56) References Cited

U.S. PATENT DOCUMENTS

| 9,383,934 B1 | 7/2016 | Lukacs et al. |
| 2008/0216176 A1 | 9/2008 | Lomont et al. |
| 2012/0117331 A1* | 5/2012 | Krause ............... G06F 12/0815 711/141 |

OTHER PUBLICATIONS

European Application # 19166385 search report dated Jul. 26, 2019.
(Continued)

*Primary Examiner* — Ernest Unelus
(74) *Attorney, Agent, or Firm* — Kligler & Associates Patent Attorneys Ltd

(57) ABSTRACT

An apparatus includes an interface and memory acquisition circuitry. The interface is configured to communicate over a bus operating in accordance with a bus protocol, which supports address-translation transactions that translate between bus addresses in an address space of the bus and physical memory addresses in an address space of a memory. The memory acquisition circuitry is configured to read data from the memory by issuing over the bus, using the bus protocol, one or more requests that (i) specify addresses to be read in terms of the physical memory addresses, and (ii) indicate that the physical memory addresses in the requests have been translated from corresponding bus addresses even though the addresses were not obtained by any address-translation transaction over the bus.

9 Claims, 2 Drawing Sheets

(51) Int. Cl.
   *G06F 12/1081*   (2016.01)
   *G06F 13/00*     (2006.01)
   *G06F 21/85*     (2013.01)
   *G06F 21/57*     (2013.01)
   *G06F 21/55*     (2013.01)
   *G06F 21/56*     (2013.01)
   *G06F 12/14*     (2006.01)

(56)              References Cited

OTHER PUBLICATIONS

Daubignard et al., "ProTIP : You Should Know What to Expect From Your Peripherals", pp. 1-33, Dec. 31, 2017.
PCI Express® Base Specification, Revision 4.0, Version 0.9, 1365 pages, May 31, 2017.

* cited by examiner

TRUSTED OUT-OF-BAND MEMORY ACQUISITION FOR IOMMU-BASED COMPUTER SYSTEMS

FIELD OF THE INVENTION

The present invention relates generally to computer systems, and particularly to methods and systems for memory acquisition in Input-Output Memory Management Units (IOMMU) based computer systems.

BACKGROUND OF THE INVENTION

In some computer systems, a Central Processing Unit (CPU) and various peripherals communicate over a Peripheral Component Interconnect Express (PCIe) bus. PCIe is specified, for example, in "PCI Express® Base Specification," Revision 4.0, Version 0.9, May 31, 2017, which is incorporated herein by reference. Chapter 10 of this specification defines Address Translation Services (ATS). ATS uses a request-completion protocol between a PCIe device and a PCIe Root Complex (RC) to provide translation services. An Address Type (AT) field is defined within Memory Read and Memory Write Transport Layer Packets (TLP). The AT field enables the Root Complex to determine whether a given request has been translated or not via the ATS protocol.

SUMMARY OF THE INVENTION

An embodiment of the present invention that is described herein provides an apparatus including an interface and memory acquisition circuitry. The interface is configured to communicate over a bus operating in accordance with a bus protocol, which supports address-translation transactions that translate between bus addresses in an address space of the bus and physical memory addresses in an address space of a memory. The memory acquisition circuitry is configured to read data from the memory by issuing over the bus, using the bus protocol, one or more requests that (i) specify addresses to be read in terms of the physical memory addresses, and (ii) indicate that the physical memory addresses in the requests have been translated from corresponding bus addresses even though the addresses were not obtained by any address-translation transaction over the bus.

In some embodiments, by indicating that the physical memory addresses in the requests have been translated, the memory acquisition circuitry is configured to prevent software-controlled address translation from being performed as part of serving the requests. In some embodiments, by indicating that the physical memory addresses in the requests have been translated, the memory acquisition circuitry is configured to guarantee that the requests will be served entirely in hardware. In some embodiments, the memory acquisition circuitry is configured to detect a malicious operation by detecting that one or more of the requests have been blocked.

There is additionally provided, in accordance with an embodiment of the present invention, a computer system including a memory, an Input-Output Memory Management Unit (IOMMU) and a peripheral device. The memory is accessible over a bus interface in accordance with a bus protocol. The IOMMU is configured to connect peripheral devices to the memory over the bus interface, including performing address-translation transactions that translate between bus addresses in an address space of the bus and physical memory addresses in an address space of the memory. The peripheral device is configured to read data from the memory by issuing over the bus, using the bus protocol, one or more requests that (i) specify addresses to be read in terms of the physical memory addresses, and (ii) indicate that the physical memory addresses in the requests have been translated from corresponding bus addresses even though the addresses were not obtained by any address-translation transaction over the bus.

There is further provided, in accordance with an embodiment of the present invention, a method including reading data from a memory by issuing one or more requests over a bus, which operates in accordance with a bus protocol that supports address-translation transactions that translate between bus addresses in an address space of the bus and physical memory addresses in an address space of the memory. The requests (i) specify addresses to be read in terms of the physical memory addresses, and (ii) indicate that the physical memory addresses in the requests have been translated from corresponding bus addresses even though the addresses were not obtained by any address-translation transaction over the bus. A responsive action is initiated in response to detecting that one or more of the requests have been blocked.

The present invention will be more fully understood from the following detailed description of the embodiments thereof, taken together with the drawings in which:

DETAILED DESCRIPTION OF EMBODIMENTS

Overview

Figure 1:
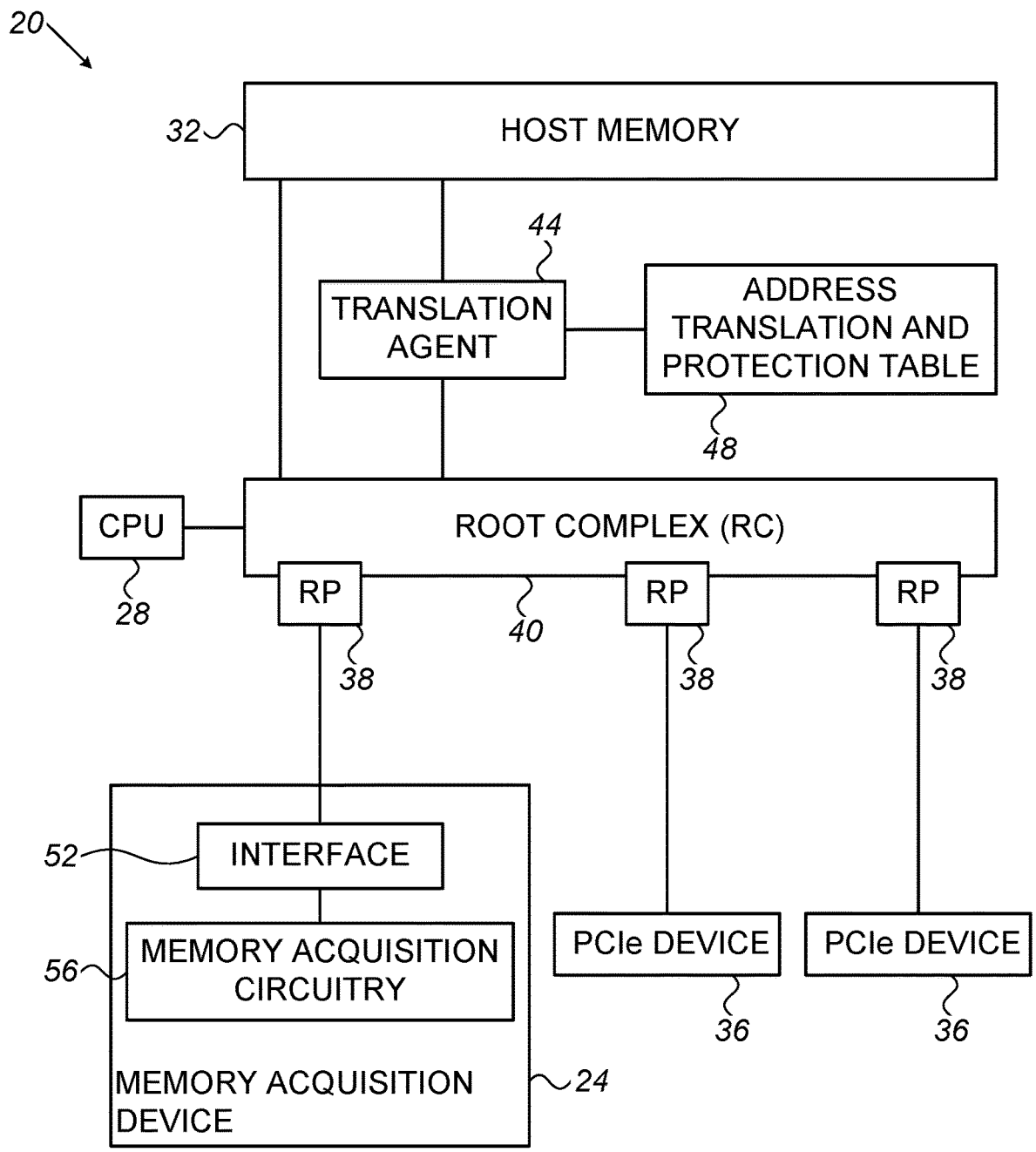
FIG. 1 is a block diagram that schematically illustrates a tampering-resilient memory acquisition device in a computer system, in accordance with an embodiment of the present invention.

Embodiments of the present invention that are described herein provide techniques for accessing a host memory over a bus by a peripheral in a computer system, in a manner that is resilient to tampering. One example use-case is detection of malware, but the disclosed techniques are applicable in any system or application that calls for trustworthy, tampering-resilient memory acquisition.

The embodiments described herein refer mainly to computer systems that are based on the Peripheral Component Interconnect Express (PCIe) bus and support Address Translation Services (ATS). In some embodiments, a PCIe-based computer system comprises a Central Processing Unit (CPU), a host memory and one or more PCIe devices. The computer system further comprises an Input-Output Memory Management Unit (IOMMU), which connects the PCIe devices to the host memory.

Among other tasks, the IOMMU performs address translation from bus addresses to physical memory addresses. In the present context, the term "physical memory addresses" refers to the physical addresses that are assigned in a physical memory of the host memory, and correspond to respective physical storage locations in the host memory. The term "bus addresses" refer to addresses that are assigned in an address space of the PCIe bus. Bus addresses are also sometimes referred to as "PCIe addresses" or "device addresses."

The ATS protocol specifies a negotiation phase in which a PCIe device requests translation of a bus address into a physical memory address. The translation is performed by a Translation Agent (TA), which may in turn query an Address Translation and Protection Table (ATPT). Following the address-translation transaction, the PCIe device is able to issue memory requests (e.g., read and write requests) using physical memory addresses.

Although the IOMMU and TA are typically implemented in hardware, the mapping between bus addresses and physical memory addresses in the ATPT is typically configured by software, e.g., by an operating system or hypervisor running on the CPU. This software control is a security risk for memory acquisition solutions implemented using PCIe devices, because tampering with the software that controls the mapping can lead to erroneous and untrustworthy memory acquisition.

Consider, for example, a security tool that is connected to the PCIe bus as (or via) a PCIe device, and attempts to detect malware by reading data from the host memory and analyzing the read data. If this tool were to use the PCIe protocol as specified, the malware could evade detection by tampering with the ATPT. For example, by modifying the address mapping in the ATPT, the malware may fool the security tool into believing it is reading a certain memory region in the host memory, while in fact it is given access to a different memory region. Using this technique, the malware could create one or more memory regions that are invisible to the security tool.

In some embodiments of the present invention, a memory acquisition device is implemented in a way that overcomes the above-described risks. The memory acquisition device comprises an interface for communicating over the PCIe bus, and memory acquisition circuitry that reads data from the host memory by issuing read requests via the interface. The memory acquisition device issues read requests that use the ATS protocol in a novel and unexpected way.

In the disclosed embodiments, the memory acquisition device issues read requests that appear to use previously-translated addresses, but without performing the preceding negotiation phase (i.e., address-translation transaction) defined in the ATS protocol. The IOMMU will typically execute such read requests in the host memory without address translation, since it wrongly assumes that the addresses have already been translated. Since the ATPT is not queried at all during this process, the addresses being read cannot be tampered with by manipulating the ATPT.

In some embodiments, the memory acquisition device issues a read request that appears to use a previously-translated address by (i) specifying the address to be read as a physical memory address, and (ii) indicating that the address has already been translated. As noted above, the read request is not preceded by an address translation request. In an embodiment, each read request comprises a two-bit "Address Type" (AT) field. See, for example, Table 10-1 in section 10.2.1 of the PCIe Base Specification, cited above. The memory acquisition device sets the AT field to '10 b' (defined as "translated"), even though the physical memory address was not obtained in any address translation process.

When using the techniques described herein, the memory acquisition device causes the IOMMU to process read requests entirely by hardware that cannot be compromised. All queries to the software-configurable ATPT are circumvented. As a result, the memory acquisition device is able to read regions of physical memory addresses of the host memory in a trustworthy manner. Any tampering with the memory acquisition process, e.g., by malware or as a result of misconfiguration or software fault, are easily detectable by the memory acquisition device. The techniques described herein enable dumping and analysis of both user-space and kernel-space memory regions.

System Description

FIG. 1 is a block diagram that schematically illustrates a computer system comprising a tampering-resilient memory acquisition device 24, in accordance with an embodiment of the present invention. Computer system 20 may comprise, for example, a server, a workstation, a personal computer, or any other suitable computing platform.

In the present example, system 20 comprises a Central Processing Unit (CPU) 28, a host memory 32, memory acquisition device 24, and optionally one or more other Peripheral Component Interconnect Express (PCIe) devices 36. Memory 32 typically comprises one or more suitable Random Access Memory (RAM) devices. PCIe devices 36 may comprise, for example, a Graphics Processing Unit (GPU), a Network Interface Controller (NIC), or any other suitable peripheral. Device 24 performs memory acquisition from host memory 32 using methods that are described in detail below.

The various elements of system 20 communicate over a PCIe bus. Each PCIe device (including devices 36 and device 24) is connected via a respective Root Port (RP) 38 to a PCIe Root Complex (RC) 40. RC 40 is also connected to CPU 28 and to memory 32.

In some embodiments, system 20 further comprises an Input-Output Memory Management Unit (IOMMU—not shown explicitly in the figure). Among other tasks, the IOMMU supports Address Translation Services (ATS). For this purpose, the IOMMU comprises a Translation Agent (TA) 44 and an Address Translation and Protection Table (ATPT) 48.

TA 44 is typically implemented in hardware. Table 48 holds a mapping between bus addresses (in the address space of the PCIe bus) and corresponding physical memory addresses (in the physical address space of memory 32). Table 48 may be stored, for example, in a specified memory region in memory 32. Table 48 is configured by software running in CPU 28, e.g., by an Operating System (OS) or hypervisor.

Agent 44 performs translation between bus addresses and corresponding physical memory addresses, in response to requests from PCIe devices 36. Following translation, the PCIe devices issue read and write requests that specify physical memory addresses. The ATS protocol is specified in detail in Chapter 10 of the PCIe Base Specification, cited above. In addition to address translation, agent 44 may also by capable of selectively granting or denying access to specified regions in memory 32 to specified PCIe devices 36.

In some embodiments, memory acquisition device 24 comprises interface circuitry 52 for communicating over the PCIe bus, e.g., with RC 40, and memory acquisition circuitry 56 that carries out the methods described herein.

The configurations of system 20 and device 24, as shown in FIG. 1, are example configurations that are shown purely for the sake of conceptual clarity. Any other suitable configurations can be used in alternative embodiments. For example, memory acquisition device may connect to the PCIe bus via a PCIe switch.

The embodiments described herein focus mainly on the task of performing secure and trustworthy memory acquisition, i.e., reading data from selected regions of memory 32 by device 24. The ways in which the data is analyzed, for detecting malware or for any other purpose, and the responsive actions that might be taken upon detecting tampering with memory acquisition, are considered outside the scope of the present disclosure.

In some embodiments the analysis and/or responsive action are carried out by device 24 itself. In other embodiments device 24 outputs the read data to an external system for further processing (e.g., analysis and/or response). The external system may comprise, for example, a system for forensics investigation, a System Information and Event Management (SIEM) system, a Virtual Machine (VM) honeypot, a malware analysis system, an Antivirus system, a rootkit detection system, a firewall, an incident response system, a performance management system, a patch management system, an updates management system, an intrusion detection system, an intrusion prevention system, or any other suitable system.

The different elements of system 20 and device 24 may be implemented using suitable hardware, such as in one or more Application-Specific Integrated Circuits (ASIC) or Field-Programmable Gate Arrays (FPGA), using software, or using a combination of hardware and software elements. In some embodiments, CPU 28 and circuitry 56 may comprise one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Trusted Tampering-Resilient Memory Acquisition by PCI-E Device

As noted above, the fact that table 48 is under control of software (e.g., operating system or hypervisor), which could be compromised, creates a security risk that can be zexploited, for example by malware. In some embodiments, circuitry 56 of memory acquisition device 24 overcomes this risk by circumventing the address translation phase altogether. This circumvention is possible since, for performing memory acquisition, device 24 needs only be aware of the physical memory addresses in memory 32. Device 24 is typically agnostic to the bus address space.

Figure 2:
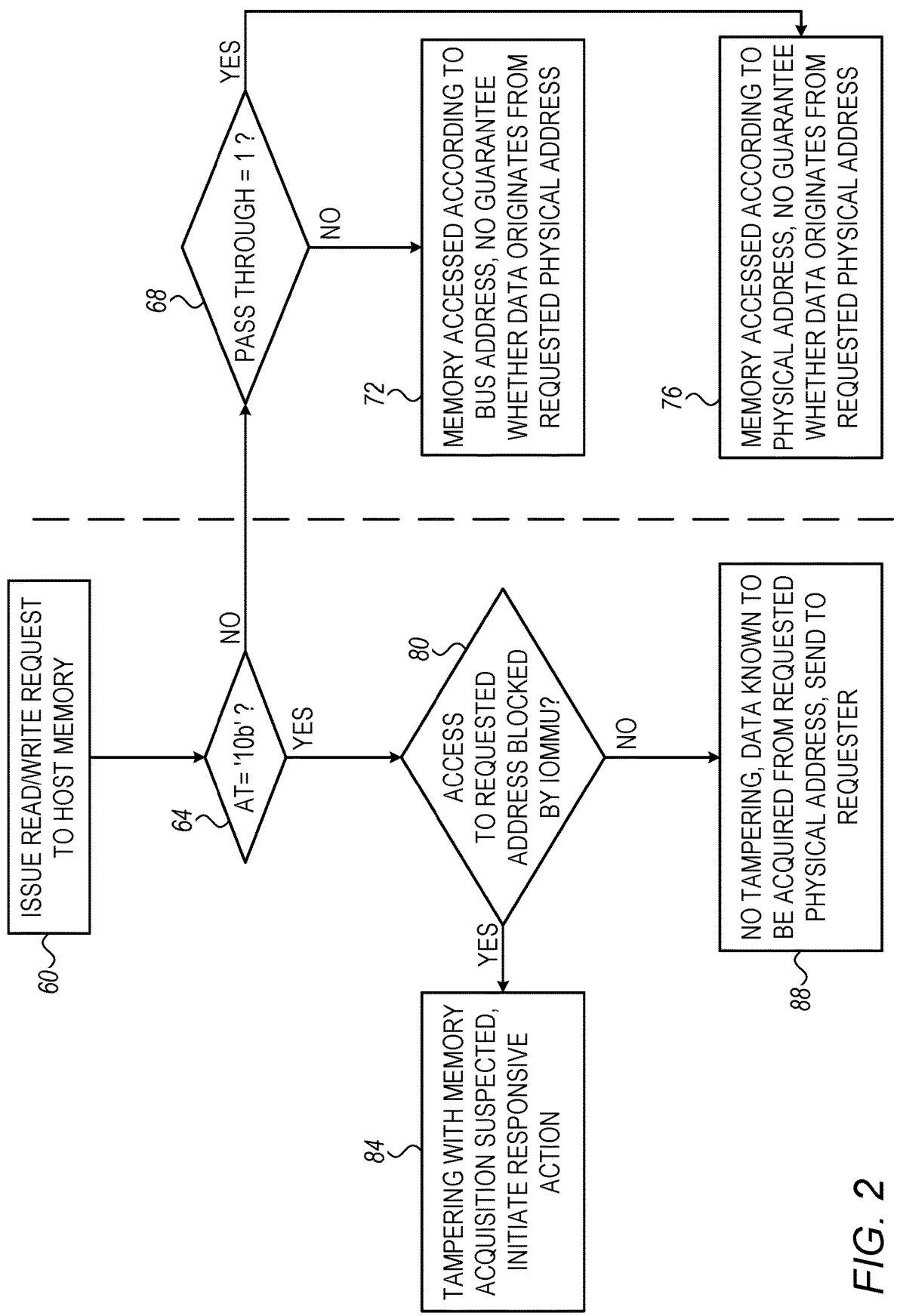
FIG. 2 is a flow chart that schematically illustrates a method for tampering-resilient memory acquisition, in accordance with an embodiment of the present invention.

FIG. 2 is a flow chart that schematically illustrates a method for tampering-resilient memory acquisition, in accordance with an embodiment of the present invention. The figure shows both conventional read/write requests and read requests issued by the disclosed memory acquisition device. The left-hand side of the flow chart (left of the vertical dashed line) is carried out by memory acquisition device 24. The right-hand side of the flow chart (right of the vertical dashed line) is depicted for reference.

The method begins with the various PCIe devices issuing read and/or write requests for reading and/or writing data from and/or to memory 32, at a requesting step 60. In particular, memory acquisition circuitry 56 of device 24 issues read requests as explained above. Each read request issued by device 24 specifies a certain physical memory address of memory 32 to be read. The Address Type (AT) field of each read request is set to '10 b', indicating that the address in the read request is the result of address translation (even though the read request was not preceded by an address-translation transaction that yielded the physical memory address).

Referring to the right-hand side of the figure: If the AT field of a read request is not '10 b', as checked at a type checking step 64, two cases are possible, as depicted at a pass-through checking step 68. If the pass-through (PT) value of the request is '0', the memory is accessed according to bus address, at a bus-address accessing step 72. If the PT value of the request is '1', the memory is accessed according to physical memory address, at a physical-address accessing step 76. In both cases (i.e., whenever AT differs from '10 b') it is impossible for the requesting device to guarantee that the request was indeed served from the requested physical memory address.

Referring to the left-hand side of the figure, performed when the AT field of a read request is '10 b', in accordance with an embodiment of the present invention. At a blocking checking step 80, memory acquisition circuitry 56 of device 24 checks whether any of the read requests has been blocked or denied by the IOMMU. If so, circuitry 56 regards the blocking as a suspected tampering operation and initiates a responsive action, at a responding step 84. Circuitry 56 may perform or trigger any suitable responsive action, such as issuing an alert to an operator (and/or to a system), or shutting down or isolating some or all of the computing system, for example.

If the IOMMU did not block any of the read requests, circuitry 56 concludes that no tampering took place. As such, circuitry 56 can send the data retrieved from memory 32 in response to the read requests for further analysis, at a sending step 88. Any suitable form of analysis can then be applied.

Although the embodiments described herein mainly address PCIe and ATS, the methods and systems described herein can also be used with other suitable bus protocol, such as Universal Serial Bus (USB), Thunderbolt, or any other suitable protocol. Although the embodiments described herein mainly address memory acquisition for the purpose of memory analysis, the disclosed techniques can also be used in any other suitable application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
    an interface, configured to communicate over a bus operating in accordance with a bus protocol, wherein the bus protocol supports address-translation transactions that translate between bus addresses in an address space of the bus and physical memory addresses in an address space of a memory; and
    memory acquisition circuitry, which is configured to read data from the memory by issuing over the bus, using the bus protocol, one or more requests that (i) specify addresses to be read in terms of the physical memory addresses, and (ii) indicate that the physical memory addresses in the requests have been translated from corresponding bus addresses even though the addresses were not obtained by any address-translation transaction over the bus, wherein the memory acquisition circuitry is configured to detect a malicious operation by detecting that one or more of the requests have been blocked and to carry out a responsive action in response to said detecting that one or more of the requests have been blocked, wherein the responsive action comprises at least one of the following: issuing an alert to an operator of the apparatus; and shutting down or isolating a portion or all of the apparatus.

2. The apparatus according to claim 1, wherein, by indicating that the physical memory addresses in the requests have been translated, the memory acquisition circuitry is configured to prevent software-controlled address translation from being performed as part of serving the requests.

3. The apparatus according to claim 1, wherein, by indicating that the physical memory addresses in the requests have been translated, the memory acquisition circuitry is configured to guarantee that the requests will be served entirely in hardware.

4. A computer system, comprising:
a memory, which is accessible over a bus interface in accordance with a bus protocol;
an Input-Output Memory Management Unit (IOMMU), configured to connect peripheral devices to the memory over the bus interface, including performing address-translation transactions that translate between bus addresses in an address space of the bus interface and physical memory addresses in an address space of the memory; and
a trusted peripheral device, which is configured to read data from the memory by issuing over the bus interface, using the bus protocol, one or more requests that (i) specify addresses to be read in terms of the physical memory addresses, and (ii) indicate that the physical memory addresses in the requests have been translated from corresponding bus addresses even though the addresses were not obtained by any address-translation transaction over the bus,
wherein the peripheral device is configured to detect a malicious operation by detecting that one or more of the requests have been blocked by the IOMMU and to carry out a responsive action in response to said detecting that one or more of the requests have been blocked,
wherein the responsive action comprises at least one of the following: issuing an alert to an operator of the apparatus; and shutting down or isolating a portion or all of the apparatus.

5. The computer system according to claim 4, wherein, by indicating that the physical memory addresses in the requests have been translated, the peripheral device is configured to prevent the IOMMU from performing software-controlled address translation as part of serving the requests.

6. The computer system according to claim 4, wherein, by indicating that the physical memory addresses in the requests have been translated, the peripheral device is configured to guarantee that the IOMMU serves the requests entirely in hardware.

7. A method, comprising:
reading data from a memory by issuing one or more requests over a bus, which operates in accordance with a bus protocol that supports address-translation transactions that translate between bus addresses in an address space of the bus and physical memory addresses in an address space of the memory, wherein the requests (i) specify addresses to be read in terms of the physical memory addresses, and (ii) indicate that the physical memory addresses in the requests have been translated from corresponding bus addresses even though the addresses were not obtained by any address-translation transaction over the bus; and
initiating a responsive action in response to detecting that one or more of the requests have been blocked,
wherein the responsive action comprises at least one of the following: issuing an alert to an operator of the apparatus; and shutting down or isolating a portion or all of the apparatus.

8. The method according to claim 7, wherein issuing the requests comprises preventing software-controlled address translation from being performed as part of serving the requests.

9. The method according to claim 7, wherein issuing the requests comprises guaranteeing that the requests will be served entirely in hardware.

* * * * *